(12) United States Patent
Slocum (10) Patent No.: US 8,776,606 B2
(45) Date of Patent: Jul. 15, 2014

(54) UNROLLING TUBE PRESSURE SENSOR

(76) Inventor: Alexander H. Slocum, Bow, NH (US)

( * ) Notice: Subject to any disclaimer, the term of this patent is extended or adjusted under 35 U.S.C. 154(b) by 375 days.

(21) Appl. No.: 13/314,376

(22) Filed: Dec. 8, 2011

(65) Prior Publication Data

US 2012/0312100 A1  Dec. 13, 2012

Related U.S. Application Data (60) Provisional application No. 61/449,708, filed on Mar. 6, 2011.

(51) Int. Cl.
G01L 7/04 (2006.01)
G01L 7/00 (2006.01)
A61M 5/315 (2006.01)

(52) U.S. Cl.
USPC .................. 73/732; 73/700; 73/756; 604/227

(58) Field of Classification Search
None
See application file for complete search history.

(56) References Cited

U.S. PATENT DOCUMENTS

| | | | |
|---|---|---|---|
| 3,911,904 A | 10/1975 | Saba | |
| 4,114,458 A | 9/1978 | Alinari | |
| 4,501,273 A | 2/1985 | McGinnis | |
| 4,759,750 A * | 7/1988 | DeVries et al. | 604/121 |
| 4,815,313 A * | 3/1989 | Beard | 73/1.62 |
| 4,844,486 A | 7/1989 | Schiemann | |
| 4,966,035 A | 10/1990 | Huang | |
| 5,103,670 A | 4/1992 | Wu et al. | |
| 5,270,685 A * | 12/1993 | Hagen et al. | 340/626 |
| 5,336,183 A | 8/1994 | Greelis et al. | |
| 5,439,178 A | 8/1995 | Peterson | |
| 5,722,955 A | 3/1998 | Racz | |
| 5,935,084 A | 8/1999 | Southworth | |
| 6,042,092 A | 3/2000 | Shibata | |
| 6,086,569 A * | 7/2000 | Schweizer | 604/227 |
| 6,485,471 B1 | 11/2002 | Zivitz et al. | |
| 7,018,359 B2 | 3/2006 | Igarashi et al. | |
| 7,383,736 B2 | 6/2008 | Esnouf | |

FOREIGN PATENT DOCUMENTS

EP  1195545 A2  4/2002

* cited by examiner

*Primary Examiner* — Lisa Caputo
*Assistant Examiner* — Jermaine Jenkins
(74) *Attorney, Agent, or Firm* — Rajesh Vallabh; Foley Hoag LLP (57) ABSTRACT

A pressure measuring device includes a partially coiled tube having a closed end and an opposite open end. The closed end is rolled and set into a coiled configuration. The device also includes a partially coiled tube supporting structure having a pressure indicating scale. The supporting structure holds the partially coiled tube such that the open end of the tube is in communication with a fluid whose pressure is to be measured. Pressure applied by the fluid causes the tube to unroll and the closed end of the tube to be visibly displaced relative to the pressure indicating scale by a distance related to the pressure applied by the fluid.

33 Claims, 7 Drawing Sheets

UNROLLING TUBE PRESSURE SENSOR

CROSS REFERENCE TO RELATED APPLICATION

This application claims priority from U.S. Provisional Patent Application No. 61/449,708, filed on Mar. 6, 2011, entitled UNROLLING TUBE PRESSURE SENSOR, which is hereby incorporated by reference.

BACKGROUND

The present application relates generally to pressure indicating devices. More particularly, it relates to a device with a coiled flattened tube, where the pressure to be measured causes the tube to unroll, resulting in an observable axial displacement that can be correlated to the amount of pressure.

Many instruments for measuring pressure rely on the pressure causing a mechanical deformation of a resilient mechanical structure such as bellows. The deformation of the structure causes an indicator to move, allowing a user to observe a value for the amount of pressure. In some fields, such as medical devices or fields in which an extreme purity of gases must be maintained, it is important to be able to measure pressure with a single element that can be made from a material compatible with the application.

Bellows can be used to measure pressure through visual monitoring of the extension of the bellows. However, bellows are difficult to manufacture with walls thin enough for accurately measuring very low pressures. Moreover, variations in wall thickness during manufacturing can lead to significant variations in accuracy. For instance, a 10% variation in wall thickness can lead to 20% or more variation in pressure indicated depending on the design of the bellows' convolutions. One of the causes of wall thickness variation is the difficulty with which the convolutions are made; most bellows are made using blow molding or injection molding, which often does not lead to accurate wall thickness, particularly in corners. Errors in thickness in the corners leads to variation in effective diameter. The diameter of a plate, which the convolution effectively is with regard to predicting compliance, varies with the diameter squared. Material thickness variation in the acute angle of the corners where two convolutions meet is typically much greater than the thickness variation on the plate region; hence it causes a more significant variation in the effective plate diameter and hence compliance of the bellows. This makes accurate measurement of very small pressures, e.g., on the order of millibar to centibars, very difficult.

When a bellows is injection molded, greater thickness control can be achieved. However, removing bellows from molds without breaking the bellows can be difficult. Additionally, it is difficult to make bellows thin enough using molding for accurate low pressure measurement.

A further difficulty with bellows is the potential for sliding mechanical contact with the supporting instrument body, and friction is notoriously non-repeatable, which gives further rise to variations in pressure measurement readings, particularly at low pressures.

BRIEF SUMMARY OF THE DISCLOSURE

A pressure measuring device in accordance with one or more embodiments includes a partially coiled tube having a closed end and an opposite open end. The closed end is rolled and set to form a coiled configuration. The device also includes a supporting and enshrouding structure having a pressure indicating scale. The supporting structure holds the partially coiled tube such that the open end of the tube is in communication with a fluid whose pressure is to be measured. Pressure applied by the fluid causes the tube to unroll and the closed end of the tube to be visibly displaced relative to the pressure indicating scale by a distance related to the pressure applied by the fluid.

A pressure measuring syringe in accordance with one or more embodiments includes a syringe barrel and a syringe plunger including a proximal end that can be manipulated by a user and an opposite distal end slidably disposed in the syringe barrel. The syringe plunger includes a pressure indicating scale. The syringe also includes a pressure sensing element disposed in the syringe plunger. The pressure sensing element comprises a partially coiled tube having a closed end and an opposite open end. The closed end is rolled and set to form a coiled configuration. The open end is attached to the distal end of the syringe plunger such that the open end of the partially coiled tube is in communication with a fluid whose pressure is to be measured. Force applied to the plunger can cause the pressure in the syringe to rise and the pressure applied by the fluid causes the partially coiled tube to unroll and the closed end of the partially coiled tube to be visibly displaced relative to the pressure scale by a distance related to the pressure applied by the fluid.

A method of making a pressure sensor in accordance with one of more embodiments comprises the steps of: (a) providing a resilient tube having a first end and an opposite second end; (b) closing and sealing the second end of the tube; (c) rolling the tube about the second end into a coiled configuration; (d) heating tube to set the second end into the coiled configuration; and (e) attaching the first end of the tube to a tube supporting structure having a pressure scale, wherein when the open end of the tube is placed in communication with a fluid, pressure applied by the fluid to the tube causes the tube to unroll and be displaced relative to the pressure scale by a distance related to the pressure applied by the fluid.

A method of making a pressure sensor in accordance with one or more embodiments comprises the steps of: (a) molding a resilient structure having a first open cylindrical portion and a second smaller diameter substantially tubular portion extending from the first cylindrical portion; (b) rolling into a coiled configuration a substantial portion of the second smaller diameter substantially tubular portion starting at an end opposite the first open cylindrical portion; (c) heating the resilient structure to set the coiled configuration so it remains coiled when in a neutral state; (d) attaching the first open cylindrical portion of the resilient cylindrical structure to a supporting structure having a pressure scale, wherein when the first open cylindrical portion is placed in communication with a fluid, pressure applied by the fluid to the coiled structure causes it to unroll and be displaced relative to the pressure scale by a distance related to the pressure applied by the fluid.

BRIEF DESCRIPTION OF THE DRAWINGS

FIGS. 1a-1c illustrate operation of the syringe to inflate a balloon such as an endotracheal cuff. FIGS. 1a-1c show no inflation, partial inflation, and full inflation of the endotracheal cuff, respectively.

FIGS. 2a-2d show the state of the sensor under applied pressures of 0 cm $H_2O$, 15 cm $H_2O$, 30 cm $H_2O$, and 45 cm $H_2O$, respectively.

FIGS. 6a-6d show the state of the sensor under applied pressures of 0 cm $H_2O$, 15 cm $H_2O$, 30 cm $H_2O$, and 45 cm $H_2O$, respectively.

Like or identical reference numbers are used to identify common or similar elements.

DETAILED DESCRIPTION

As will be described in further detail below, pressure indicating devices in accordance with various embodiments include an unrolling tube pressure sensing element, which comprises a partially rolled and flattened elastic tube held in a supporting structure. An open end of the tube is in communication with a fluid whose pressure is to be measured. As the fluid pressure is increased, the unrolled portion of the tube urges the tube to expand to a generally circular cross-sectional shape, which pushes the rolled portion forward. The expanded portion also moves forward further pushing the rolled portion forward into an increasingly unrolled state as the pressure rises. The structure includes a pressure measurement scale comprising one or more pressure value markers that a user can use to visually correlate the tube's displacement with the amount of applied pressure.

The pressure indicating devices can provide very fine pressure measurements, either of very low pressures or of pressures with very high accuracy and repeatability because there is extremely low friction associated with rolling contact.

The pressure indicating devices can have a broad range of applications including, e.g., in medical devices, and as a dynamic fluid capacitive element in precision fluid instruments. In semiconductor and pharmaceutical manufacturing where process gasses must often have precise pressure control, the device can provide a quick visual indicator of pressure while also acting as a dynamic capacitive element to help control pressure.

In one particular example illustrated in the drawings, unrolling tube pressure sensing elements in accordance with one or more embodiments are implemented in syringes used to inflate an endotracheal tube (ET) cuff when a patient is intubated. Such syringes typically have a barrel inside diameter of about 16 mm and a length of about 75 mm. It should be understood that the unrolling tube pressure sensing elements are scalable to a variety of other applications and pressures including, without limitation, for inflation of cuffs for pediatric and neonatal ET tubes. Furthermore, unrolling tube pressure sensing elements can have a variety of non-medical device applications, as indicated above.

Figures 1A, 1B, 1C:
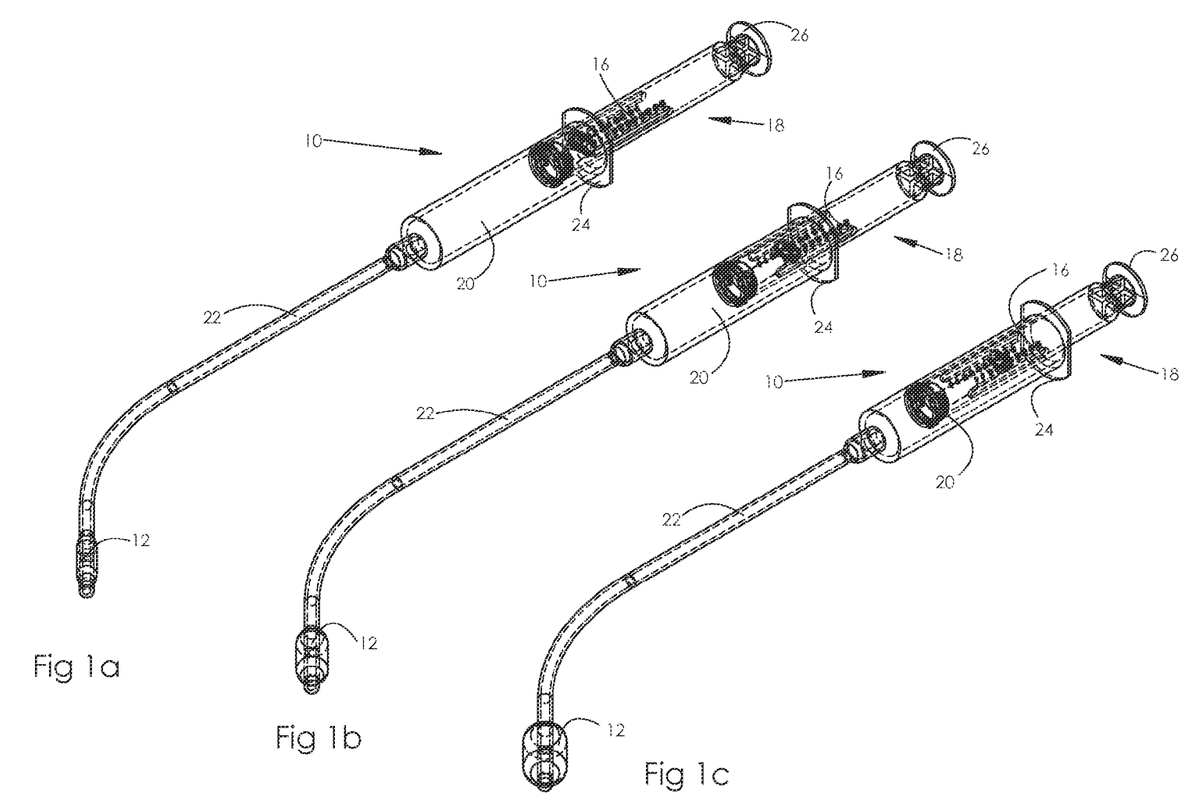
FIGS. 1a-1c are isometric views of a pressure sensing syringe including an unrolling tube pressure sensing element in accordance with one or more embodiments.
Figure 6A:
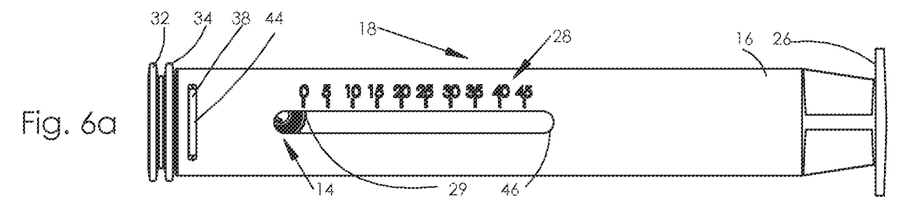
FIGS. 6a-6d are side views illustrating a syringe plunger and unrolling tube pressure sensing element assembly in accordance with one or more embodiments.
Figure 6B:
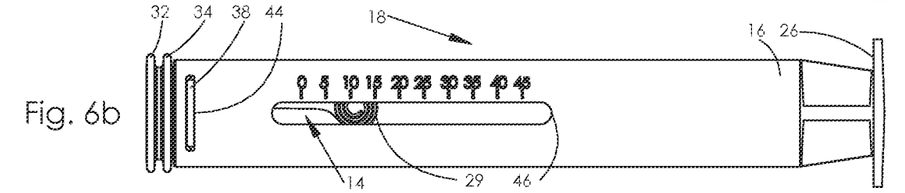
Figure 6C:
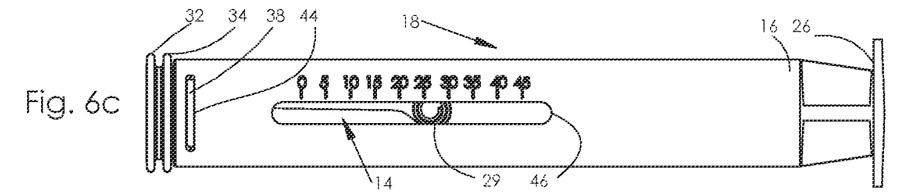

FIGS. 1a-1c illustrate a pressure sensing syringe 10 in accordance with one or more embodiments in different stages of inflating an endotracheal cuff balloon 12. The syringe 10 includes an unrolling tube pressure sensing element 14 installed in a syringe plunger 16. The plunger 16 and unrolling tube pressure sensing element 14 form a subassembly 18 as shown in further detail in FIGS. 6a, 6b, and 6c, which show the subassembly 18 in different stages of use corresponding to FIGS. 1a, 1b, 1c, respectively. The subassembly 18 is slidably disposed in a syringe barrel 20.

The barrel 20 of the syringe 10 is connected via a tube 22 to the balloon 1. Flange 24 on the barrel 20 resists an opposing force that would be applied to the syringe plunger end 26 during use.

A pressure measurement scale 28 on the plunger 16 includes one or more pressure value markings that can be used by a user to correlate the tube's unrolled position with a measurement reading.

Figure 6D:
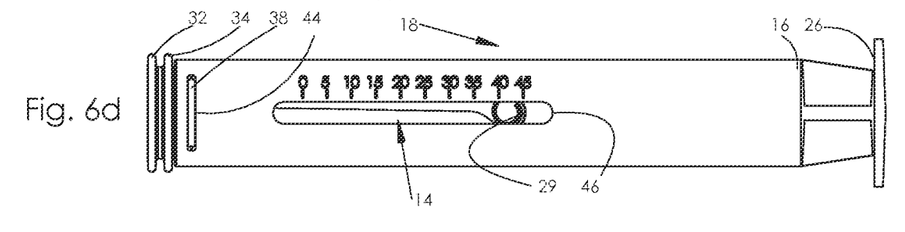

The states during use of the pressure sensing syringe 10 shown in FIGS. 1a, 1b, and 1c and FIGS. 6a, 6b, and 6c are, respectively, of not inflating, partially inflating, and fully inflating a balloon such as an endotracheal cuff balloon 6. FIG. 6d shows an over-inflated state of 45 cm of $H_2O$. In different states of inflation from uninflated to partially inflated to fully inflated, the still-rolled tip of the tube (coiled portion) 29 progressively advances relative pressure measurement scale 28 as the syringe plunger subassembly 18 moves in the syringe barrel 20.

The syringe barrel 20 in one or more embodiments can be made of a generally clear material such as a clear plastic to allow a user to see the pressure scale 28. Alternately, in some applications, the unrolling tube pressure sensing element 14 and plunger 16 can be configured to have a longer body length so that the pressure measurement scale 28 is always outside the syringe barrel 20. However, in this case, the dead space volume of the sensor would be increased.

FIGS. 2a, 2b, 2c, and 2d are front views showing the unrolling tube pressure sensing element 14 in its uninflated (0 cm $H_2O$) and partially inflated (15 cm, 30 cm, and 45 cm $H_2O$) states, respectively. FIGS. 3a, 3b, 3c, and 3d are corresponding side views of the unrolling tube pressure sensing element 14 also in its uninflated (0 cm $H_2O$) and partially inflated (15 cm, 30 cm, and 45 cm $H_2O$) conditions, respectively. The coiled portion 29 of the unrolling tube pressure sensing element 14 is shown in different states from being fully coiled to mostly uncoiled.

The unrolling tube pressure sensing element 14 has a base 30 with sealing rings 32 and 34, and snap-fit protrusions 36 and 38. Because the seals are integral with the pressure sensing element 14 and move with it, seal friction will not affect the accuracy of the pressure measurement; the friction forces between the seals and the barrel wall do not act on the unrolling tube sensor structure.

By way of example, for the application of a pressure sensing syringe for inflating an endotracheal cuff, the tube portion of the sensor element 14 near the base 30 is about 6 mm in diameter, and the unrolled length is about 55 mm and tapers with a cone angle of 2 degrees to a distal end diameter of about 4 mm. The tube comprises rubber and has a wall thickness of 0.1 mm, but could be as thick as 0.15 mm. The sensor will unroll about 30 mm under 45 cm $H_2O$ pressure if a soft rubber such as a silicone rubber with an elastic modulus on the order of 10,000 $N/m^2$ is used. A variety of other resilient materials can also be used. The material should not chemically alter the fluid or gas to which it is exposed.

As the sensor unrolls axially under pressure, the inner diameter of the spiral will remain relatively constant, but the outer diameter will decrease. The linearity (or nonlinearity) and sensitivity of the sensor can be controlled by the taper in the tube when first molded.

Figure 2A:
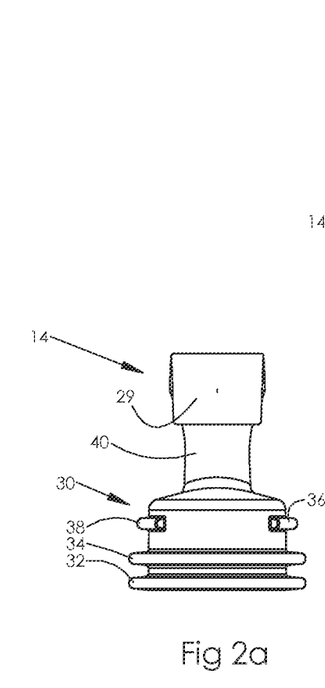
FIGS. 2a-2d are front views of an unrolling tube pressure sensing element in accordance with one or more embodiments.
Figure 2B:
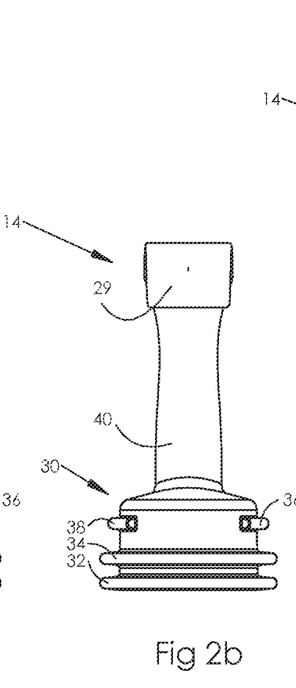
Figure 2C:
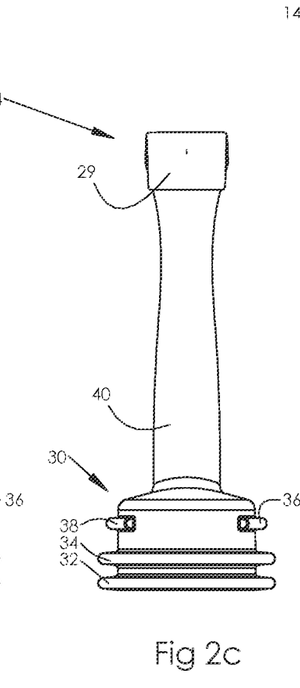
Figure 2D:
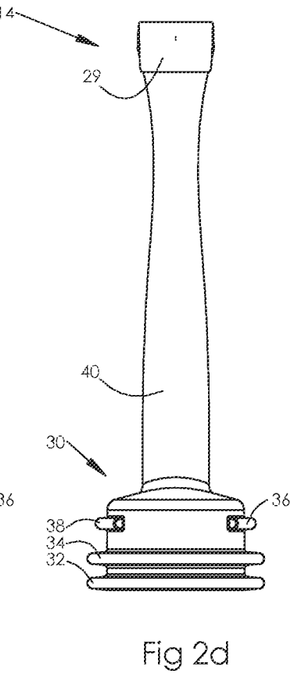
Figure 3A:
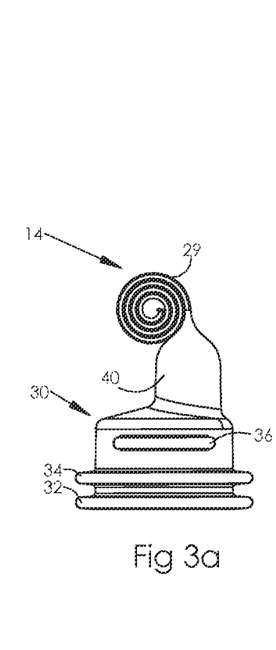
FIGS. 3a-3d are side views of the unrolling tube pressure sensing element corresponding to FIGS. 2a-2d, respectively.
Figure 3B:
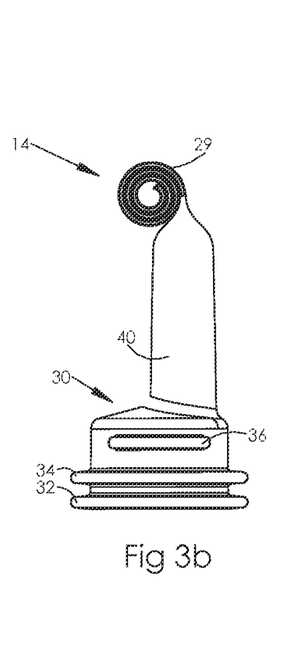
Figure 3C:
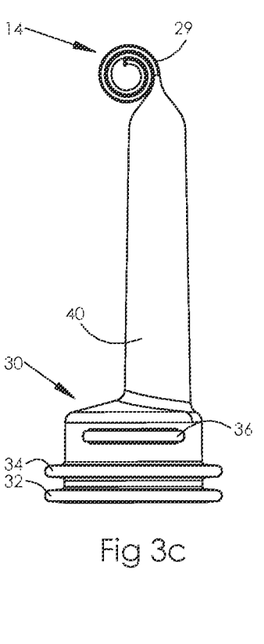
Figure 3D:
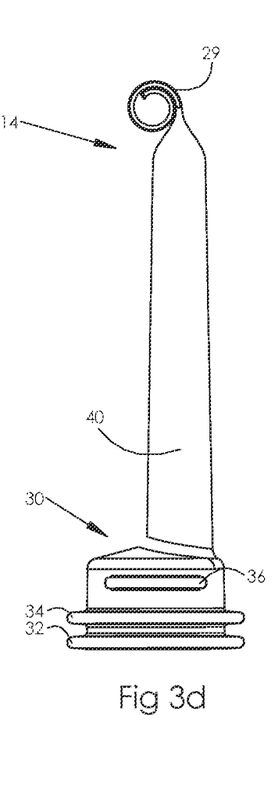
Figure 4A:
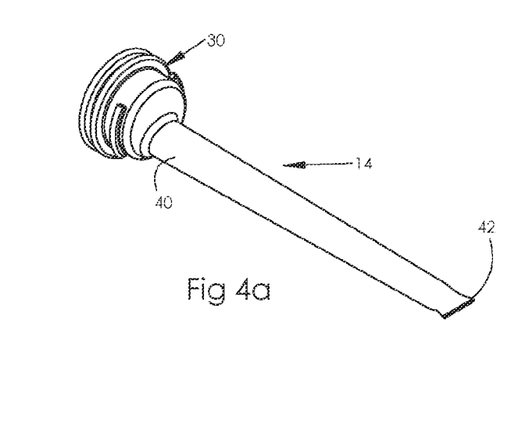
FIGS. 4a-4e are various views of the unrolling tube pressure sensing element in an unrolled state during manufacture.
Figure 4B:
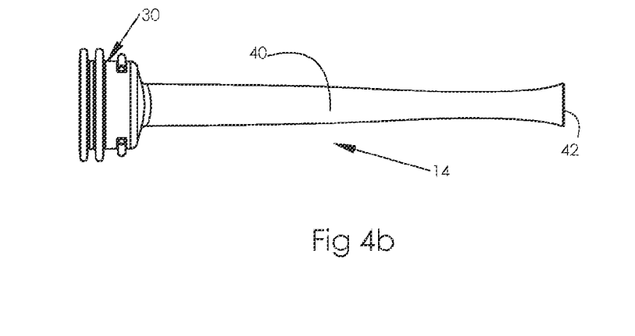
Figure 4C:
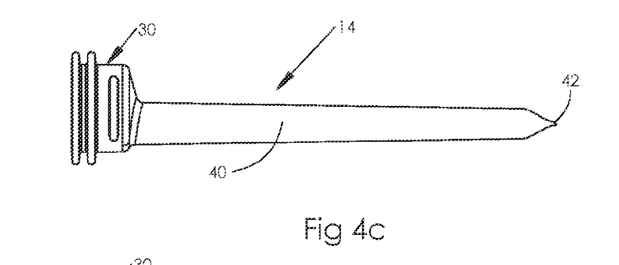
Figure 4D:
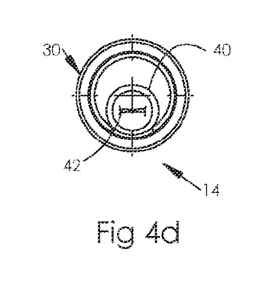
Figure 4E:
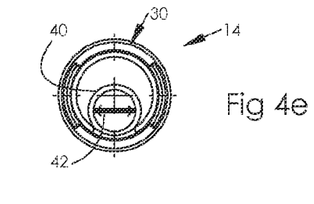

FIGS. 4a-4e are various views of a tube that can be formed into an unrolled tube pressure sensor in accordance with one or more embodiments. The tube shown in the figures is in an unrolled state after injection molding. The end 42 is pinched closed and sealed prior to being rolled into a coil, or it may be molded with the pinched end. As shown in FIG. 2d, near full extension, the mostly unrolled spiral coil is narrower than the fully coiled spiral tube in FIG. 2a. The taper can be formed from a change in the diameter of the tube along its length while the wall thickness is held constant, or the diameter (inside or outside) can be constant and the wall thickness varied, or a combination of both. In general, constant wall thickness is better for molding. Correlation between pressure and the amount of unrolling can be determined in various ways including, e.g., experimentally. The preferred method of manufacture is to mold the sensor 14 in the unrolled state with the end already flat, and then flatten and form the rest of the coil by rolling it up. Heating the material then causes it to take a set in an equilibrium rolled-upstate. A simple extruded tube with no taper can also be bonded to a base 30 and then the coil formed by pinching and sealing the end closed and then rolling the coil and heating it to set in the rolled state. However, such a simple tube will not allow for tapering the diameter or thickness and thus it may be difficult to control pressure sensitivity of the device. Still such devices can have utility as, e.g., overpressure indicators.

Figure 5A:
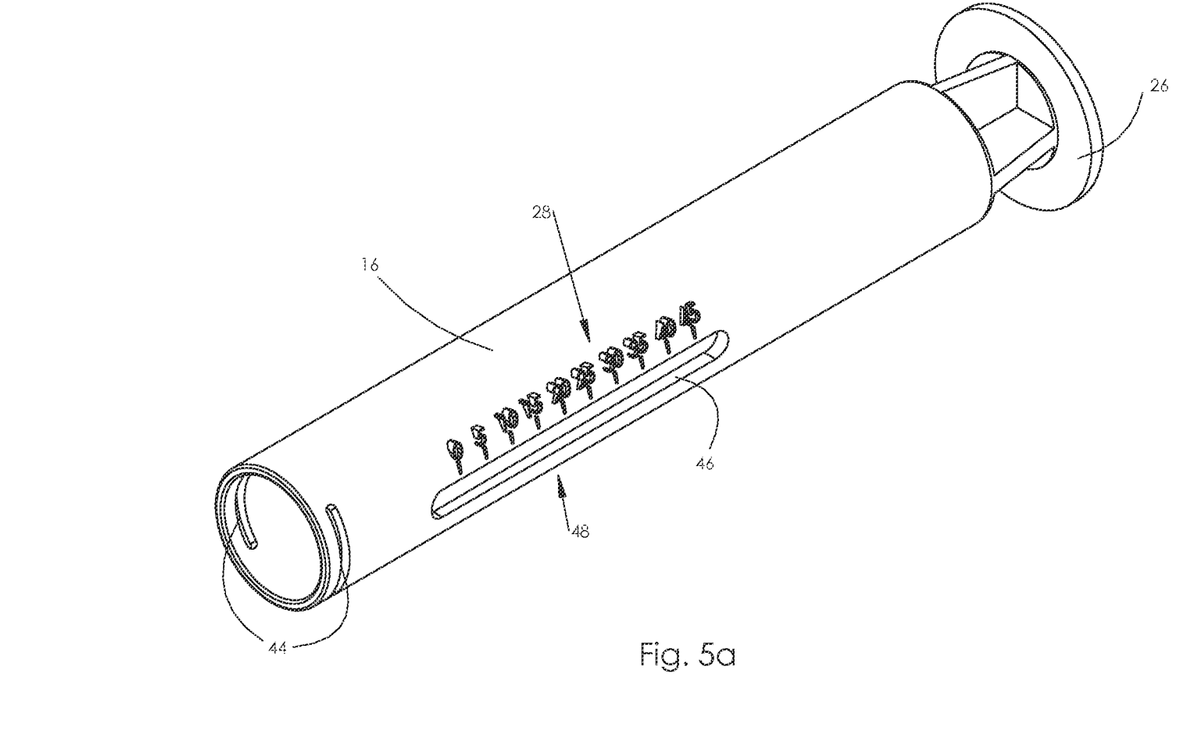
FIG. 5a is an isometric view of a syringe plunger in accordance with one or more embodiments in which an unrolling tube pressure sensing element can be installed.

FIG. 5a shows an enshrouding structure 16 (acting as the plunger in a syringe application) in accordance with one or more embodiments. It includes slots 44 near its base that axially and rotationally constrains the unrolling tube pressure sensing element 14 by engaging the sensor's snap-in tabs 36 and 38. The pressure measurement scale 28 includes a slot 46, through which the unrolling to pressure sensor can be viewed, and one or more markings of a scale 28, which can be molded integral with the structure 16 or inked on or even be an applied label. The slots 46 can be omitted if the structure 16 is sufficiently clear to allow a user to view the pressure sensor through the structure 16. For ergonomic reasons, multiple measurement scales located circumferentially around the structure 16 body can be used. The sensor region is located and scaled in accordance with the sensor's sensitivity and size. In the exemplary embodiment of FIG. 5a, it is sized and labeled to indicate centimeters of water pressure. Note that the sensor region 48 (and its mirror image) is aligned with the slots 44 so the part can easily be molded with two halves and a simple core.

Figure 5B:
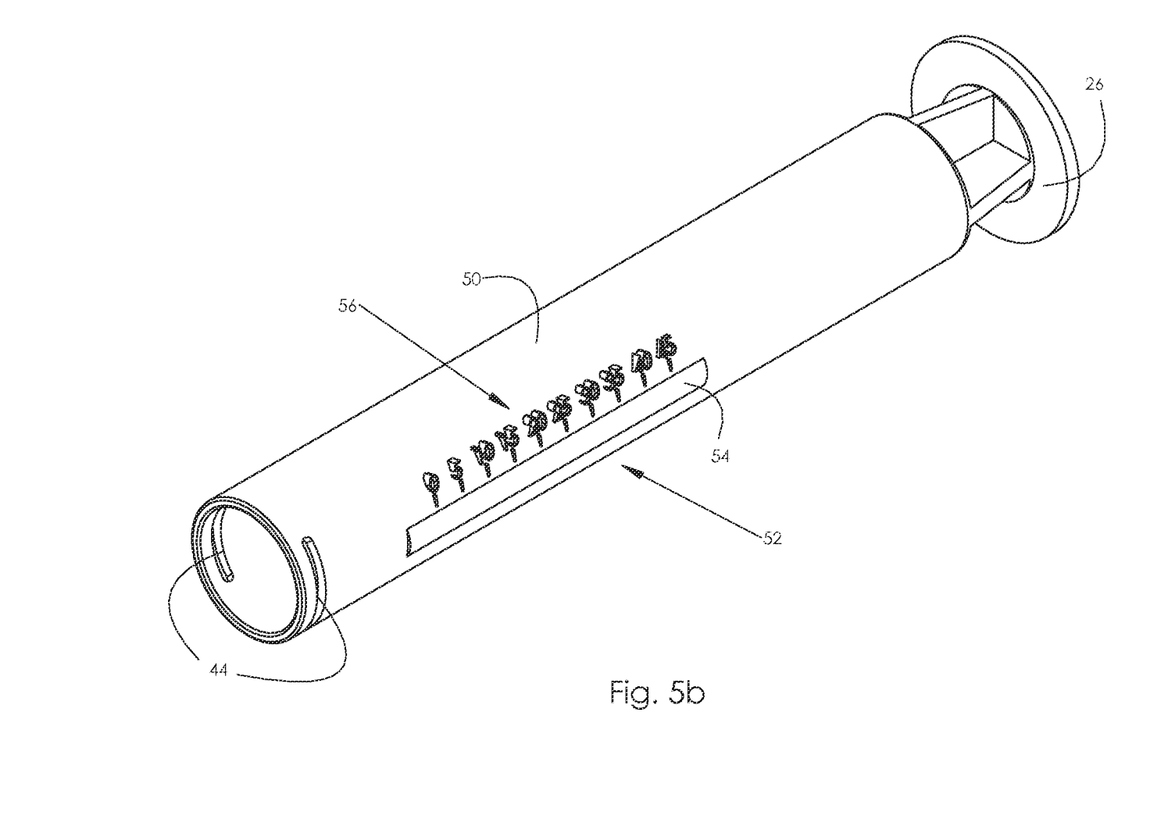
FIG. 5b is an isometric view of an alternate syringe plunger with a magnification feature in accordance with one or more embodiments in which an unrolling tube pressure sensing element can be installed.

FIG. 5b shows a second alternate embodiment of an enshrouding structure 50 (also referred to as the plunger in a syringe application). It also has slots 44 near its base that axially and rotationally constrains the sensor via the snap-in tabs 36 and 38 on the sensor 14. The sensor region 52 includes cylindrical lens structures 54 that help magnify the end position of the sensor and make it easier to read the position of the end of the sensor with respect to the scale 56. The scale 56 can be molded integral with the structure 50 or inked on or even be a label applied to the structure 50. Only one side is shown here, and for ergonomic reasons, multiple sets placed circumferentially around the structure body 50 can be used. The sensor region is located and scaled in accordance with the sensor's sensitivity and size. In the exemplary embodiment of FIG. 5b, it is sized and labeled to indicate centimeters of water pressure. Note that the sensor region 52 (and its mirror image) is aligned with the slots 44 so the part can easily be molded with two halves and a simple core.

When the unrolling tube pressure sensing element 14 is incorporated into the plunger of a syringe, the high sealing forces not only provide an excellent seal, but can also maintain plunger position when finger forces are removed from the plunger. This allows a user to periodically visually check the pressure and, if needed, adjust the position of the plunger to maintain position while indicating a true and accurate pressure reading proportional or otherwise related to its extension.

Since the unrolling tube sensor is in effect parallel with the plunger with its distal end substantially free from contact with its enshrouding structure, it will primarily experience forces created by the air pressure on the tube. This will cause the unrolling tube pressure sensing element 14 to be relatively rigid and substantially free from contact with the enshrouding structure walls and avoid friction forces that might affect its ability to unroll. The unrolling tube sensor can thus provide a true and accurate pressure reading proportional or otherwise related to its unrolled state.

Having thus described several illustrative embodiments, it is to be appreciated that various alterations, modifications, and improvements will readily occur to those skilled in the art. Such alterations, modifications, and improvements are intended to form a part of this disclosure, and are intended to be within the spirit and scope of this disclosure. While some examples presented herein involve specific combinations of functions or structural elements, it should be understood that those functions and elements may be combined in other ways according to the present disclosure to accomplish the same or different objectives. In particular, acts, elements, and features discussed in connection with one embodiment are not intended to be excluded from similar or other roles in other embodiments.

Additionally, elements and components described herein may be further divided into additional components or joined together to form fewer components for performing the same functions.

Accordingly, the foregoing description and attached drawings are by way of example only, and are not intended to be limiting.

What is claimed is:

1. A pressure measuring device, comprising:
a partially coiled tube having a closed end and an opposite open end, said closed end being rolled and set into a coiled configuration; and
a partially coiled tube supporting structure having a pressure indicating scale, said supporting structure holding the partially coiled tube such that the open end of the tube is in communication with a fluid whose pressure is to be measured and pressure applied by the fluid causes the tube to unroll and the closed end of the tube to be visibly displaced relative to the pressure indicating scale by a distance related to the pressure applied by the fluid.

2. The pressure measuring device of claim 1, wherein said pressure indicating scale includes one or more pressure value indicators.

3. The pressure measuring device of claim 1, wherein the partially coiled tube is tapered over at least a portion of its length to tune its response to pressure.

4. The pressure measuring device of claim 1, wherein the partially coiled tube has a wall thickness that varies over at least a portion of its length to tune its response to pressure.

5. The pressure measuring device of claim 1, wherein the partially coiled tube is tapered over at least a portion of its length and its wall thickness varies over at least a portion of its length to tune its response to pressure.

6. The pressure measuring device of claim 1, wherein the partially coiled tube comprises rubber.

7. The pressure measuring device of claim 1, wherein the structure enshrouds the partially coiled tube and comprises a generally clear material enabling a user to view displacement of the partially coiled tube in the structure.

8. The pressure measuring device of claim 1, wherein the structure includes a magnification element to enhance a user's view of the displacement of the partially coiled tube held by the structure.

9. The pressure measuring device of claim 1, wherein the partially coiled tube supporting structure comprises a plunger of a pressure measuring syringe.

10. The pressure measuring device of claim 9, wherein sealing forces between the plunger and a barrel of the syringe create static friction forces to maintain an axial position the plunger when user finger forces are removed from the plunger.

11. The pressure measuring device of claim 1, wherein the partially coiled tube supporting structure is configured to hold the partially coiled tube such that the partially coiled tube can unroll without substantial frictional engagement with walls of the structure.

12. A pressure measuring syringe, comprising:
a syringe barrel;
a syringe plunger including a proximal end that can be manipulated by a user and an opposite distal end slidably disposed in the syringe barrel, said syringe plunger including a pressure indicating scale; and
a pressure sensing element disposed in the syringe plunger, said pressure sensing element comprising a partially coiled tube having a closed end and an opposite open end, said closed end being rolled and set into a coiled configuration, said open end being attached to the distal end of the syringe plunger such that the open end of the partially coiled tube is in communication with a fluid whose pressure is to be measured and pressure applied by the fluid causes the partially coiled tube to unroll and the closed end of the partially coiled tube to be visibly displaced relative to the pressure scale by a distance related to the pressure applied by the fluid.

13. The pressure measuring syringe of claim 12, wherein the syringe is adapted to inflate an endotracheal tube cuff.

14. The pressure measuring syringe of claim 12, wherein said pressure indicating scale includes one or more pressure value indicators.

15. The pressure measuring syringe of claim 12, wherein the partially coiled tube is tapered over at least a portion of its length to tune its response to pressure.

16. The pressure measuring syringe of claim 12, wherein the partially coiled tube has a wall thickness that varies over at least a portion of its length to tune its response to pressure.

17. The pressure measuring syringe of claim 12, wherein the partially coiled tube is tapered over at least a portion of its length and its wall thickness varies over its length to tune its response to pressure.

18. The pressure measuring syringe of claim 12, wherein the partially coiled tube comprises rubber.

19. The pressure measuring syringe of claim 12, wherein the plunger comprises a material enabling a user to view displacement of the tube held by the plunger.

20. The pressure measuring syringe of claim 12, wherein the plunger includes a magnification element to enhance a user's view of the displacement of the partially coiled tube held by the plunger.

21. The pressure measuring syringe of claim 12, wherein sealing forces between the plunger and the syringe barrel create static friction forces to maintain an axial position the plunger when user finger forces are removed from the plunger.

22. The pressure measuring syringe of claim 12, wherein syringe plunger is configured to hold the partially coiled tube such that the partially coiled tube can unroll without substantial frictional engagement with walls of the syringe plunger.

23. A method of making a pressure sensor, comprising the steps of:
(a) providing a rubber tube having a first end and an opposite second end;
(b) closing and sealing the second end of the tube;
(c) rolling the tube about the second end into a coiled configuration;
(d) heating the tube to set the second end into the coiled configuration; and
(e) attaching the first end of the tube to a tube supporting structure having a pressure scale, wherein when the open end of the tube is placed in communication with a fluid, pressure applied by the fluid to the tube causes the tube to unroll and be displaced relative to the pressure scale by a distance related to the pressure applied by the fluid.

24. The method of claim 23, further comprising tapering the tube to tune its response to pressure.

25. The method of claim 24, wherein tapering the tube comprises varying the thickness of the tube along at least a portion of its length.

26. The method of claim 24, wherein tapering the tube comprises varying its outer shape along at least a portion of its length.

27. The method of claim 24, wherein the tube supporting structure comprises a plunger of a pressure measuring syringe.

28. A method of making a pressure sensor, comprising the steps of:
(a) molding a resilient structure having a first open cylindrical portion and a second smaller diameter substantially tubular portion extending from the first cylindrical portion;
(b) rolling into a coiled configuration a substantial portion of the second smaller diameter substantially tubular portion starting at an end opposite the first open cylindrical portion;
(c) heating the resilient structure to set the coiled configuration so it remains coiled when in a neutral state;
(d) attaching the first open cylindrical portion of the resilient structure to a supporting structure having a pressure scale, wherein when the first open cylindrical portion is placed in communication with a fluid, pressure applied by the fluid to the coiled structure causes it to unroll and be displaced relative to the pressure scale by a distance related to the pressure applied by the fluid.

29. The method of claim 28, further comprising tapering the second smaller diameter substantially tubular portion to tune its response to pressure.

30. The method of claim 29, wherein tapering the second smaller diameter substantially tubular portion comprises varying the thickness of the tube along its length.

31. The method of claim 29, wherein tapering the second smaller diameter substantially tubular portion comprises varying its outer shape along its length.

32. The method of claim 28, wherein the substantially tubular portion is molded with an open end, and further comprising pinching and sealing shut the open end prior to being rolled into a coil.

33. The method of claim 28, wherein the first open cylindrical portion includes circumferential sealing rings that engage the supporting structure.

* * * * *